Feb. 7, 1950 — L. A. SKINNER ET AL — 2,496,316
ROCKET PROJECTOR
Filed Sept. 22, 1943 — 2 Sheets-Sheet 2
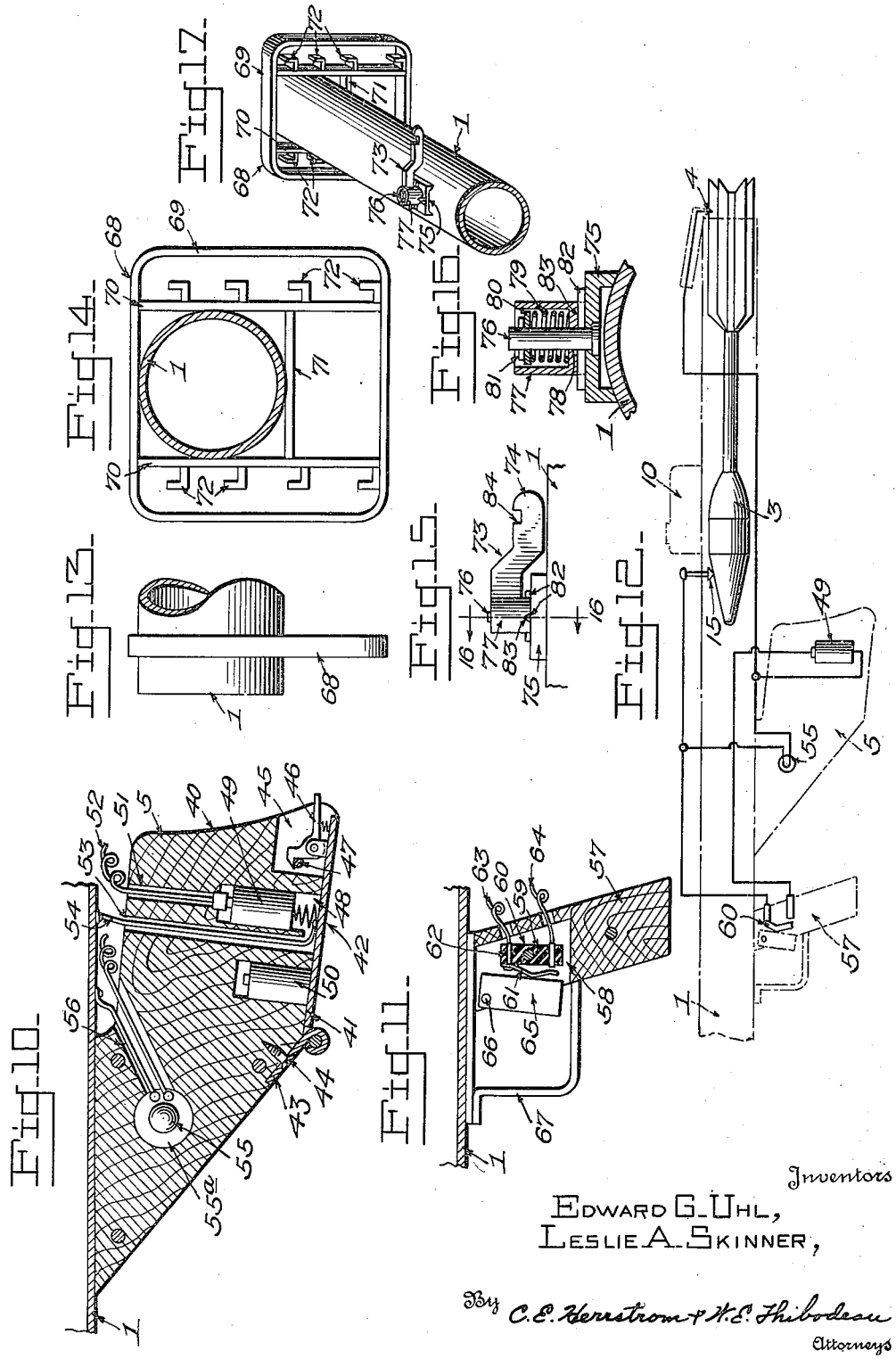
Inventors
EDWARD G. UHL,
LESLIE A. SKINNER,
By C. E. Herrstrom & W. E. Thibodeau
Attorneys Patented Feb. 7, 1950

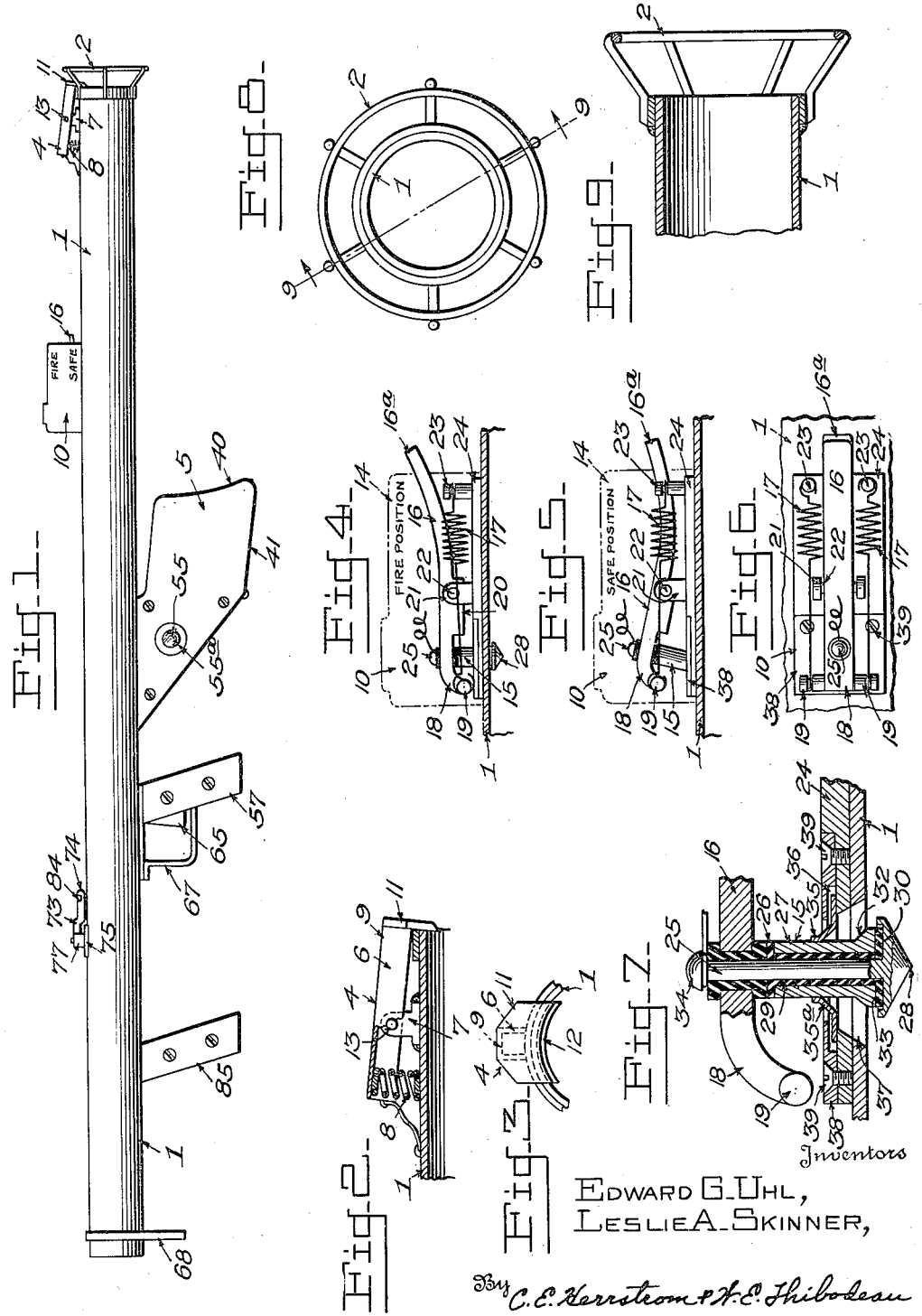

2,496,316

UNITED STATES PATENT OFFICE 2,496,316

ROCKET PROJECTOR

Leslie A. Skinner, Washington, D. C., and Edward G. Uhl, Elizabeth, N. J., assignors to the United States of America as represented by the Secretary of War Application September 22, 1943, Serial No. 503,411

7 Claims. (Cl. 89—1.7)

(Granted under the act of March 3, 1883, as amended April 30, 1928; 370 O. G. 757)

The invention described herein may be manufactured and used by or for the Government for governmental purposes without the payment to us of any royalty thereon.

This invention relates to a rocket projector, particularly to an electrically fired rocket projector.

It is an object of this invention to provide a light weight compact rocket projector capable of projecting a rocket of substantial dimensions and which can be readily carried by a single individual.

A particular object of this invention is to provide an electrical firing system for a rocket projector which is not only simple but also extremely reliable in operation.

A further object of this invention is to provide an improved sight for a rocket projector.

The specific nature of the invention as well as other objects and advantages thereof will clearly appear from a description of a preferred embodiment as shown in the accompanying drawings in which:

Fig. 1 is a side elevational view of the rocket projector.

Fig. 2 is an enlarged fragmentary longitudinal sectional view taken at the rear of the rocket projector to show details of the electrical contact member.

Fig. 3 is a rear end elevational view of Fig. 2 looking muzzleward of the rocket projector.

Fig. 4 is a detail side elevational view of the safety device, with the cover thereof removed, in ready position.

Fig. 5 is a view similar to Fig. 4 but showing the parts of the safety device in safe position.

Fig. 6 is a top elevational view of Figs. 4 and 5.

Fig. 7 is an enlarged fragmentary longitudinal sectional detail view of the front contact plunger.

Fig. 8 is a rear end elevational view of the funnel-shaped guide ring shown in Fig. 1.

Fig. 9 is a sectional view taken along 9—9 of Fig. 8.

Fig. 10 is an enlarged fragmentary longitudinal sectional view of the butt stock showing details of the source of electric current.

Fig. 11 is an enlarged detail view in longitudinal section of the trigger mechanism.

Fig. 12 is a wiring diagram of the rocket projector.

Fig. 13 is a side elevational view of the front sight mounted on a rocket tube.

Fig. 14 is a rear end elevational view of Fig. 13.

Fig. 15 is an enlarged rear elevational view of the rear sight.

Fig. 16 is an enlarged longitudinal sectional view taken along the plane 16—16 of Fig. 15 showing the pivotal mounting of the rear sight.

Fig. 17 is a perspective view, looking towards the muzzle of the rocket projector, showing the sights aligned in firing position.

The rocket projector essentially comprises a long thin walled open ended tube or barrel which is proportioned to receive a rocket. The length of the tube is preferably sufficiently greater than the rocket so that the propellant blast of the rocket will have substantially subsided about the time the rocket leaves the tube. The rocket is electrically fired within the projector by a source of current contained in the butt stock of the projector. A conventional trigger is provided which when actuated closes an electrical circuit thereby effecting discharge of the rocket. A safety device is provided on top of the tube, which is particularly desirable for two man actuation of the projector as it prevents accidental discharge of the rocket.

The rocket projector shown in assembled relation in Fig. 1 comprises a tube 1, a butt stock 5, and a safety device 10. The tube 1 is preferably a long thin sheet steel tube. A funnel shaped wire guide ring 2 is welded to the rear end of tube 1 as shown in Fig. 1, to facilitate loading of a rocket 3 (Fig. 12) into tube 1 from the rear end and further to prevent the rear end of the tube from being closed by abutting against an object. A spring biased contact catch 4 is pivotally mounted on top of tube 1 and is arranged to engage the rear end of rocket 3 and to make electrical contact therewith. A tail catch 4 is secured to the top of the tube 1 adjacent the rear end thereof for positioning the rocket within the tube and for completing an electrical circuit through the rocket, in a manner to appear. The tail latch (Fig. 2) comprises an arm 6 pivotally mounted in a bracket 7 which is secured to the tube and is provided at one end 9 with a downwardly projecting lug 11 as shown in Fig. 3. The bottom edge of lug 11 is provided with an arcuate surface 12 for engaging a notch in the tail portion of the rocket 3 as schematically shown in Fig. 12. The arm 6 is of inverted U-shape construction and is pivotally mounted in the bifurcated bracket 7 by a pin 13. A spring 8 between the top of tube 1 and the underside of arm 6 biases the arcuate end 12 or arm 6 downwardly into a position to contact the rocket 3 being loaded into a tube 1.

Safety device 10 is shielded from chance blows by a cover 14. Safety device 10 comprises a contact plunger 15 (Figs. 4 and 5), a lever 16, and two spring 17 mounted on a base 24 secured to the top of the tube 1. Lever 16 is provided with an upwardly curved end 16a which projects somewhat beyond cover 14 so that it may be grasped by the fingers of an operator in order to be manually moved upwardly or downwardly. The other end 18 of lever 16 is curved downwardly and is provided in the end thereof with a transverse pin 19. A small integral rectangular lug 20 is provided on the underside of lever 16. A bifurcated bracket 21 welded to a suitable base 24, receives between its bifurcated portions the lever 16 which is pivotally mounted on bracket 21 by a pin 22 passed thru lug 20.

Two studs 23 are suitably secured to the rear edge of base 24, as shown in Figs. 4, 5, and 6, one on each side of lever 16 for mounting one end of each of springs 17. The other end of each spring 17 is placed about transverse pin 19. The springs 17 are provided to bias the contact plunger 15 into contact with a rocket 3 in a manner to be described. Contact plunger 15 comprises a pin 25 an insulator 26, and a body 27. Pin 25 is inserted in an axial hole 29 provided in the insulator 26 and terminates in a conical point 28 which engages the rocket 3. The insulator 26 is substantially cylindrical and is surrounded by a body 27. The body 27 surrounds the insulator 26. A sloped shoulder 32 is provided near the lower end of the body 27 and this sloped end is separated from the end 28 of pin 25 by a suitable insulating washer 33 locked within an annular groove 30 of the pin 25. The upper end of the insulator 26 is inserted in a suitable hole near the end 18 of lever 16 and the head of pin 25 is pinned over to secure the plunger assembly 15 to lever 16. End 28 projects down through a suitable hole 37 in base 24 of safety device 10 and extends thru the wall of tube 1. A stop 35 surrounds body 27 and rests in a square recess 36 about the hole 37. A sloped surface 35a corresponding to sloped surface 32 on body 27 is provided on the underside of stop 35 to engage sloped surface 32 and arrest the upward movement of plunger 15. Stop 35 is retained in recess 36 by a suitable washer 38 which is in turn secured to base 24 by the screws 39. When the end 16a of lever 16 is in the raised position as shown in Fig. 4, the pin 19 is below the horizontal axis of pin 22 which mounts lever 16 and hence the bias of springs 17 will keep the lever 16 in this position until forcibly moved to another position. When the end 16a of lever 16 is depressed, the end 19 of lever 16 rises above the horizontal axis of pin 22 thereby raising plunger 15 out of contact with rocket 3. When pin 19 is above the horizontal axis of pin 22, the bias of springs 17 will hold the lever in this position.

The butt stock 5 is mounted on the underside of tube 1 approximately in the center thereof and is suitably secured thereto. An arcuately shaped end 40 is provided to comfortably fit the shoulder of the operator. The bottom 41 of shoulder stock 5 is substantially parallel to barrel tube 1. Butt stock 5 is sloped upwardly from the bottom 41 to meet barrel tube 1. A hinged floor plate 42 which is a thin sheet metal member is mounted on the flat bottom portion 41 of shoulder stock 5. The stationary end 43 of hinged floor plate 42 is mounted on the sloped surface of shoulder stock 5 and is secured thereto by a screw 44. A recess 45 is provided in the lower end of shoulder stock 5 to house a conventional spring biased catch 46 which locks the hinged portion of floor plate 42 to shoulder stock 5 by engaging a transverse pin 47 in shoulder stock 5. A cylindrical recess 48 is provided in the bottom of shoulder stock 5 to house a small battery 49. A spare battery 50 placed in a similar cylindrical recess adjacent cylindrical recess 48 may also be provided. A small hole 51 connects the top of cylindrical recess 48 with the upper edge of butt stock 5 so that a lead wire 52 can make connection with the positive terminal of battery 49. A hole 53 parallel to hole 51 is provided so that a lead wire 54 may be brought into contact with the negative terminal of battery 49. A small light bulb 55 is mounted in a suitable socket 55a on the side of shoulder stock 5 in the forward upper portion thereof. A diagonal hole 56 is provided in stock 5 which communicates with the socket 55a and the upper edge of stock 5 so that suitable wires may be led to the light bulb socket. Light bulb 55 is utilized as a warning signal so that the operator may know whether the firing circuit is open or closed.

A pistol grip 57 is mounted somewhat ahead of shoulder stock 5 on the underside of tube 1 and is suitably secured thereto. Pistol grip 57 is provided with a recess 58 as shown in Fig. 11 in which is mounted a trigger switch 60. The switch 60 comprises a small rectangular member 59 of suitable electrical insulating material mounted on a transverse screw. A contact spring 61 is mounted on the forward side of member 59 and is secured thereto by a pin 62. Two terminals 63 and 64 are provided at each end of member 59, pin 62 terminating in terminal 63. Spring 61 is arranged to be depressed by a trigger 65 which is pivotally mounted at its upper end in recess 58 of pistol grip 57 by a transverse pin 66. When trigger 65 is depressed the free end of spring 61 is likewise depressed which contacts terminal 64 thereby making electrical contact. Trigger 65 is protected against accidental discharge by a suitably shaped trigger guard 67.

The electrical circuit is shown in Fig. 12. The battery 49 is connected in series with the trigger switch 60 and rocket contacts 4 and 15. It will be understood that suitable cylindrical contact plates are provided on the rocket 3 at the points of engagement with contacts 4 and 15 and that wiring connections are provided within rocket 3 to any desired form of electrical primer (not shown). Warning light 55 is connected across contacts 4 and 15 and will be ignited by closing of trigger switch 60 indicating that the circuit is in firing condition.

A front sight 68 is mounted on the muzzle end of tube 1 as shown in Figs. 1, 14, and 17. The front sight 68 comprises a rectangular shaped member 69, two front sight blade brackets 70 and a web 71. The brackets 70 are narrow rectangular strips welded at each end to the rectangular member 69 as shown in Fig. 14 and are parallel to each other and so spaced that they will snugly engage each side of barrel tube 1. The web 71 is placed between and is welded to brackets 70. L-shaped sight blades 72 are welded to each of brackets 70 between brackets 70 and the sides of rectangular member 69. Blades 72 are so spaced as to permit different elevations of sight to be obtained for varying ranges. Sight blades 72 are provided on each of brackets 70 so that a right or left hand firer can be accommodated. Front sight 68 is placed over and welded to barrel tube 1 at the points of contact of the brackets 70, web 71, and one side of rectangular member 69, as shown in Fig. 14.

A rear sight 73 has a sighting arm 74 (Fig. 15) mounted on a circular base member 75 welded to the top of tube 1 slightly ahead of pistol grip 57. A headed pin 76 is vertically mounted in inverted position in the center of base 75, as shown in Fig. 16. Sighting arm 74 is welded to a tubular member 77, one end of which is closed and provided with an axial hole 78 for mounting the member 77 on pin 76. Within the tubular member 77 and about pin 76 is a spring 79 which rests upon the closed end of the member 77. Spring 79 is retained within member 77 by a washer 80 secured by a transverse pin 81 inserted in a suitable hole in pin 76. Spaced integral V-shaped projections 82 are provided on base 75 which engage corresponding V-shaped notches 83 in the base of tubular member 77 for retaining the sighting member 74 in any of four selected positions. The spring 79 biases tubular member 74 into engagement with each of the projections 82. A substantially U-shaped sighting notch 84 is provided in the arm 74. The sighting arm 74 may be readily pivoted to the right or to the left so that a right or left hand shooter can readily and conveniently align the sighting arm with either of the front sight blades 72. Sighting arm 74 may be swung into a position parallel with tube 1, as shown in Fig. 1, when carrying the weapon. A foregrip 85, suitably secured ahead of pistol grip 57 to the underside of tube 1, may be provided to facilitate holding and aiming the rocket projector.

The rocket 3 is loaded into tube 1 from the rear, the funnel shaped guide 2 serving to guide the rocket into the tube. Loading is generally done by personnel other than the firer of the projector. Prior to insertion of rocket 3 into tube 1, the end 16a of lever 16 of safety device 14 is depressed by the loader to the safe position as shown in Fig. 5. This brings plunger 15 out of the tube and prevents contact with the inserted rocket. Rear contact 4 of course is also raised to permit insertion of the rocket 3 into tube 1. When rocket 3 has been fully inserted, contact 4 is released and engages the rear end of rocket 3 making electrical contact therewith. To fire a rocket, the projector is held by a firer in much the same manner as firing a rifle or other shoulder arm. Sighting is accomplished by alignment of rear sight notch 84 and an appropriate arc of the front sight blades 72 depending on the range of the target. Prior to discharging the projector however, lever 16 is raised to the ready or firing position. This is generally done by the loader when he has taken position beside the rocket projector, safe from the blast of the rocket. This brings plunger 15 into contact with the forward end of rocket 3. When trigger 65 is pulled, spring 61 contacts terminal 64 thereby closing the electrical circuit and effecting discharge of the rocket. Light 55 remains lit as long as trigger 65 is pulled.

From the foregoing description, it is readily apparent that a weapon of the type above described can be easily supported and fired from the shoulder by a single individual. Furthermore, the simple rugged construction assures reliable operation under all conditions.

We claim:

1. A portable rocket projector comprising an extended hollow tube open at both ends and adapted to receive a rocket therein through one of said ends, a spring pressed latch mounted on said tube adjacent one of said ends and adapted to engage the rocket to hold the same from falling out of said tube, a guide structure projecting rearwardly and outwardly from said tube adjacent said latch to facilitate loading of said projector, said guide structure comprising spaced wire-like members, a shoulder stock secured to said tube intermediate the ends thereof, a pistol grip on said tube longitudinally spaced from said shoulder stock, a trigger mechanism mounted in said pistol grip, and means actuated by said trigger for firing a rocket inserted in said tube.

2. A portable rocket projector comprising an extended hollow tube open at both ends and adapted to receive a rocket therein through one of said ends, a shoulder stock secured to said tube intermediate the ends thereof, a pistol grip on said tube longitudinally spaced thereon from said shoulder stock, a first electrical contact pivotably connected on said tube, a second electrical contact spaced from the same and mounted on said tube but electrically insulated therefrom, said contacts being adapted to effect electrical connection with a rocket inserted in said tube, said shoulder stock having a recess arranged to receive a battery, a trigger mechanism mounted in said pistol grip, an electrical switch means mounted in said pistol grip and normally held in an open position, said electrical switch means being arranged adjacent said trigger mechanism for actuation thereby to a closed position and electrical connections arranged to apply a voltage from the battery to said first electrical and said second electrical contacts through said electrical switch.

3. A portable rocket projector comprising an extended hollow tube open at both ends and adapted to receive a rocket therein through one of said ends, a shoulder stock secured to said tube intermediate the ends thereof, a pistol grip on said tube longitudinally spaced thereon from said shoulder stock, a first electrical contact pivotably connected on said tube, a second electrical contact spaced from the same and mounted on said tube but electrically insulated from the same, said electrical contacts being adapted to effect electrical connection with a rocket inserted in said tube, said stock having a recess arranged to receive a battery, a trigger mechanism mounted in said pistol grip, an electrical switch means mounted in said pistol grip and normally held in an open position, said switch being arranged adjacent said trigger mechanism for actuation thereby to a closed position, electrical connections arranged to apply a voltage from the battery to said first electrical and said second electrical contacts through said electrical indicating means in the shoulder stock and electrically connected in parallel with said contacts and responsive to the energization of the same whereby open and closed positions of the trigger mechanism are indicated.

4. A portable rocket projector comprising an extended hollow tube open at both ends and adapted to receive a rocket therein through one of said ends, a shoulder stock secured to said tube intermediate the ends thereof, a pistol grip on said tube longitudinally spaced thereon from said shoulder stock, a spring pressed latch mounted on the rear of said tube arranged to effect electrical connection with a rocket inserted in said tube and to releasably retain said rocket in said tube, an electrical contact spaced from said latch, support means movably mounting the same on said tube but insulated therefrom for movement through the walls thereof, spring means associated with said support means for moving said electrical contact through the walls of said tube to effect electrical connection with the said rocket inserted in said tube, said shoulder stock having a recess arranged to receive a battery, a trigger mechanism mounted in said pistol grip, an electrical switch means mounted in said pistol grip and normally held in an open position, said electrical switch means being adjacent said trigger mechanism and arranged to be closed by actuation of the same and electrical connections arranged to apply a voltage from the battery across said latch and said electrical contact through said electrical switch means.

5. A portable rocket projector comprising an extended hollow tube open at both ends and adapted to receive a rocket therein through one of said ends, a shoulder stock secured to said tube intermediate the ends thereof, a pistol grip on said tube longitudinally spaced thereon from said shoulder stock, a spring pressed latch mounted on the rear of said tube arranged to effect electrical connection with a rocket inserted in said tube and to releasably retain said rocket in the tube, an electrical contact spaced from said latch, support means movably mounting the same on said tube but insulated therefrom for movement through the walls thereof, spring means associated with said support means for moving electrical contact through the walls of said tube and arranged to effect electrical connection with the said rocket inserted in said tube, said shoulder stock having a recess arranged to receive a battery, a trigger mechanism mounted in said pistol grip, an electrical switch means mounted in said pistol grip and normally held in an open position, said electrical switch means being adjacent said trigger mechanism and arranged to be closed by actuation of the same, electrical connections arranged to apply a voltage from the battery across said latch and said electrical contact through said electrical switch means, and electrical indicating means in the shoulder stock and electrically connected in parallel with said latch and said electrical contact and responsive to the energization of the same whereby open and closed positions of the trigger mechanism are indicated.

6. A portable rocket projector comprising an extended hollow tube open at both ends and adapted to receive a rocket therein through one of said ends, a shoulder stock secured to said tube intermediate the ends thereof, a pistol grip on said tube longitudinally spaced thereon from said shoulder stock, a spring pressed latch mounted on the rear of said tube arranged to effect electrical connection with said rocket inserted in said tube and to releasably retain said rocket in said tube, an electrical contact, means pivotally mounting the same on said tube, a manually operable member connected to said pivot means, resilient means connected to said pivot means and arranged to snap said electrical contact into and out of engagement with the said rocket inserted in said tube, said shoulder stock having a recess arranged to receive a battery, a trigger mechanism mounted in said pistol grip, an electrical switch means mounted in said pistol grip and normally held in an open position, said switch means being adjacent said trigger mechanism and arranged to be closed by actuation of the same and electrical connections arranged to apply a voltage from the battery to said latch and said electrical contact through said electrical switch means.

7. A portable rocket projector comprising an extended hollow tube open at both ends and adapted to receive a rocket therein through one of said ends, a shoulder stock secured to said tube intermediate the ends thereof, a pistol grip on said tube longitudinally spaced thereon from said shoulder stock, a spring pressed latch mounted on the rear of said tube arranged to effect electrical connection with said rocket inserted in said tube and to releasably retain said rocket in said tube, an electrical contact, means pivotally mounting the same on said tube, a manually operable member connected to said pivot means, resilient means connected to said pivot means and arranged to snap said electrical contact into and out of engagement with the said rocket inserted in said tube, said stock having a recess arranged to receive a battery, a trigger mechanism mounted in said pistol grip, an electrical switch means mounted in said pistol grip and normally held in an open position, said switch means being adjacent said trigger mechanism and arranged to be closed by actuation of the same, electrical connections arranged to apply a voltage from the battery to said latch and said electrical contact through said electrical switch means, and electrical indicating means in the shoulder stock and electrically connected in parallel with said latch and said electrical contact and responsive to the energization of the latch and contact whereby open and closed positions of the trigger mechanism are indicated.

LESLIE A. SKINNER.
EDWARD G. UHL.

REFERENCES CITED

The following references are of record in the file of this patent:

UNITED STATES PATENTS

| Number | Name | Date |
|---|---|---|
| 223,251 | Shelton | Jan. 6, 1880 |
| 307,070 | Russell | Oct. 21, 1884 |
| 799,206 | Thring | Sept. 12, 1905 |
| 815,490 | Thomas | Mar. 30, 1906 |
| 817,331 | Olson | Apr. 10, 1906 |
| 1,045,075 | Pompili | Nov. 19, 1912 |
| 1,108,715 | Davis | Aug. 25, 1914 |
| 1,205,756 | LeBaron | Nov. 21, 1916 |
| 1,294,240 | Cooke | Feb. 11, 1919 |
| 1,373,381 | Cooke | Mar. 29, 1921 |
| 1,434,044 | Cooke | Oct. 31, 1922 |
| 1,475,761 | Fisher | Nov. 27, 1923 |
| 1,661,091 | Riabouchinski | Feb. 28, 1928 |
| 1,818,381 | Caruth | Aug. 11, 1931 |
| 2,134,406 | Jacobs | Oct. 25, 1938 |
| 2,209,380 | Bell | July 30, 1940 |